(12) United States Patent
Vangell et al.

(10) Patent No.: US 9,785,967 B1
(45) Date of Patent: Oct. 10, 2017

(54) CONSUMER DATA AGGREGATION AND SEGMENTED MARKETING COMMUNICATION SYSTEM AND PROCESS

(71) Applicants: Ron Michael Vangell, San Clemente, CA (US); Kevin Garcia Cooper, Laguna Niguel, CA (US)

(72) Inventors: Ron Michael Vangell, San Clemente, CA (US); Kevin Garcia Cooper, Laguna Niguel, CA (US)

( * ) Notice: Subject to any disclaimer, the term of this patent is extended or adjusted under 35 U.S.C. 154(b) by 157 days.

(21) Appl. No.: 14/295,028

(22) Filed: Jun. 3, 2014

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0276* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0073156 | A1* | 6/2002 | Newman | G06Q 10/107 709/206 |
| 2003/0061094 | A1* | 3/2003 | Banerjee | G06Q 20/202 705/14.24 |
| 2004/0044690 | A1* | 3/2004 | Kanzinger | G06Q 30/02 |
| 2005/0015362 | A1* | 1/2005 | Ostertag | G06Q 10/06311 |
| 2005/0045728 | A1* | 3/2005 | Kargman | G06Q 30/02 235/462.45 |
| 2007/0046018 | A1* | 3/2007 | Ochi-Okorie | G09F 23/10 283/53 |
| 2007/0108270 | A1* | 5/2007 | Bjoraker | G06Q 20/10 235/380 |
| 2009/0148124 | A1* | 6/2009 | Athsani | G06Q 30/02 386/241 |
| 2010/0049611 | A1* | 2/2010 | Rojas | G06Q 30/02 705/14.66 |
| 2010/0205045 | A1* | 8/2010 | Zhang | G06Q 30/02 705/14.1 |
| 2011/0055264 | A1* | 3/2011 | Sundelin | G06Q 10/107 707/776 |
| 2011/0082731 | A1* | 4/2011 | Kepecs | G06Q 30/02 705/14.17 |
| 2011/0191152 | A1* | 8/2011 | Schwartz | G06Q 20/387 705/14.1 |
| 2012/0084122 | A1* | 4/2012 | Boehle | G06Q 30/06 705/14.1 |
| 2013/0138816 | A1* | 5/2013 | Kuo | G06F 9/5011 709/226 |
| 2013/0211890 | A1* | 8/2013 | Heitmueller | G06Q 30/0207 705/14.13 |
| 2013/0246040 | A1* | 9/2013 | DeLuca | G06Q 50/01 704/2 |
| 2014/0330713 | A1* | 11/2014 | Isaacson | G06Q 20/342 705/41 |

* cited by examiner

*Primary Examiner* — Matthew T Sittner
(74) *Attorney, Agent, or Firm* — Plager Schack LLP

(57) ABSTRACT

A cloud-based consumer data aggregation and segmented marketing communication system and process that use suppression and duplication algorithms are disclosed. The system includes a database that is accessible by user over the Internet. The system performs the process to track redemption and follow user defined rules for predefined messaging and promotions. Data is aggregated, cleansed, segmented, suppressed and distributed using pre-defined user rules.

5 Claims, 4 Drawing Sheets

CONSUMER DATA AGGREGATION AND SEGMENTED MARKETING COMMUNICATION SYSTEM AND PROCESS

BACKGROUND

Embodiments of the invention described in this specification relate generally to consumer-focused communication and marketing, and more particularly, to consumer data aggregation systems used in consumer-focused communication and marketing.

Companies, organizations, and many other entities (hereinafter referred to individually as "company" or collectively as "companies") that deal directly with consumers have a vested interest in communicating with and marketing to possible interested consumers. Many customer relationship management systems that exist provide ways to manage and maintain consumer contact information. However, many times consumer contacts become stale or new systems get deployed and old customer contacts are lost. This is problematic for any company that intends to maintain communication with consumer contacts.

Even when consumer data is retained, the usefulness of the consumer data is typically spotty. For instance, such consumer data, obtained over any duration of time, typically lacks parameters or other indicators that allow the data to be organized by customer segment, category, and/or usage patterns. Yet these are a few critical representations of data, which when organized accordingly, allows targeted marketing and accurate consumer tracking.

Therefore, what is needed is a way to assist companies to recapture lost customer and consumer contacts and acquire new customers and consumer leads in order to target and track specific consumers by distribution of physical collateral, such as reward cards, direct mailings, savings and member-discount cards, fobs (e.g., self-authenticating and identifying devices typically latched to a person's key chain), or by digital distribution using virtual cards or any other coded digital object distributed via email or web-based sign up, and thereby identify such consumers by customer segment, category, and usage information using pre-defined user rules.

BRIEF DESCRIPTION

Some embodiments of the invention include a novel consumer data aggregation and segmented marketing communication system that assists companies to recapture lost customer and consumer contacts and acquire new customers and consumer leads. In some embodiments, the system is connected to the Internet to aggregate data from a plurality of local and cloud-based sources. In some embodiments, the system analyzes the aggregated data, categorizes customers and consumers according to a set of business rules, and outputs categorized sets of target customers and consumers. In some embodiments, the system associates a coded mail distribution file with each categorized set of target customers and consumers.

In some embodiments, the system uses a coded mail distribution file to distribute to the customers and consumers in each category at least one of physical collateral and digital collateral. In some embodiments, the system tracks usage of the distributed collateral. In some embodiments, the collateral includes "coded" information that is read or scanned at a redemption point to instantly identify customer segment, category, and usage information.

In some embodiments, the system tracks marketing communications to customers and consumers. In some embodiments, the marketing includes a set of user-defined rules for distributing consumer messaging and promotions that can be redeemed at a redemption point. In some embodiments, the system evaluates the tracked usage and reports on purchasing behavior, revenue amounts, and demographic patterns. In some embodiments, the data is aggregated, cleansed, segmented, suppressed and distributed using pre-defined user rules.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
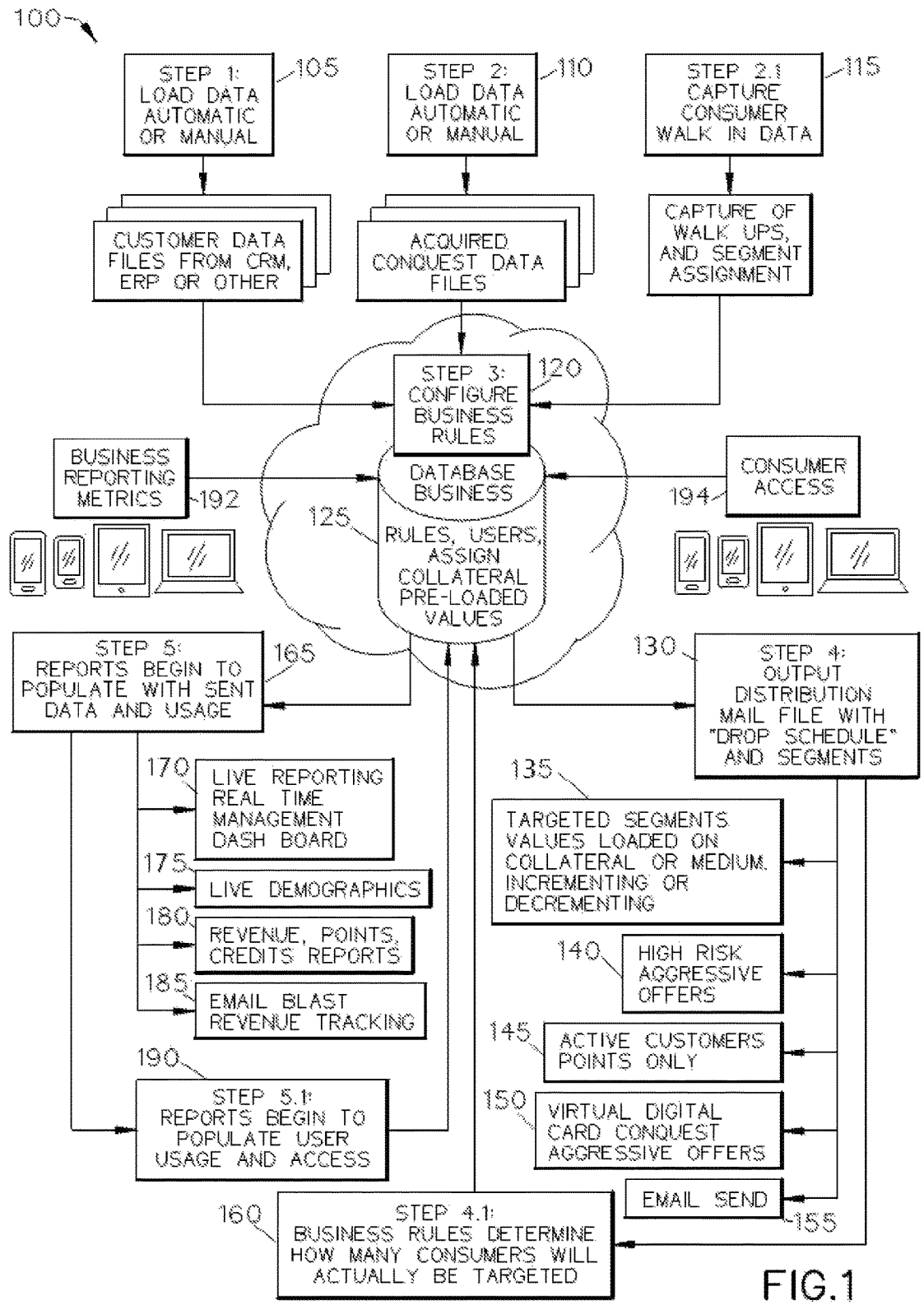
FIG. 1 conceptually illustrates a consumer data aggregating and segmented market communication system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel consumer data aggregation and segmented marketing communication system that assists companies to recapture lost customer and consumer contacts and acquire new customers and consumer leads. In some embodiments, the system is connected to the Internet to aggregate data from a plurality of local and cloud-based sources. In some embodiments, the system analyzes the aggregated data, categorizes customers and consumers according to a set of business rules, and outputs categorized sets of target customers and consumers. In some embodiments, the system associates a coded mail distribution file with each categorized set of target customers and consumers.

In some embodiments, the system uses a coded mail distribution file to distribute to the customers and consumers in each category at least one of physical collateral and digital collateral. Examples of physical collateral include plastic, paper, or other material-type collateral, such as rewards cards, direct mail (e.g., fliers, cards, letters, etc.), savings cards, and/or fobs. Examples of digital collateral include virtual cards or any other coded digital object distributed via email or web-based sign up. In some embodiments, the system tracks usage of the distributed collateral. In some embodiments, the collateral includes "coded" information that is read or scanned at a redemption point to instantly identify customer segment, category, and usage information.

In some embodiments, the system tracks marketing communications to customers and consumers. In some embodiments, the marketing includes a set of user-defined rules for distributing consumer messaging and promotions that can be redeemed at a redemption point. In some embodiments, the system evaluates the tracked usage and reports on purchasing behavior, revenue amounts, and demographic patterns. In some embodiments, the data is aggregated, cleansed, segmented, suppressed and distributed using pre-defined user rules.

As stated above, many companies need a way to recapture lost and acquire new customers through cloud based data aggregation and analytics. Embodiments of the invention described in this specification solve such problems by a system and process which apply business logic and hierarchical rules to evaluate, suppress, and clean customer and consumer data aggregated from a set of local and cloud-based data sources, and thereby generate a distribution mail file that indexes and segments the customer and consumer data according to a set of pre-defined categories and outputs a categorized target file. The system uses the categorized target file to contact consumers by pre-described rules that govern the type of communication and quality of the communication medium (e.g., whether physical collateral, digital collateral, or both are used). Usage of all distributed collateral is tracked and reports are created for purchasing, revenue and demographic patterns, as well as other metrics.

Some embodiments of the system and the process described in this specification differ from and improve upon currently existing customer and consumer communication and marketing systems because none of the systems, to date, have the ability to track usage of distributed collateral. The existing customer and consumer communication and marketing systems lack improvements of the system and the process described in this specification, which use identifiable and trackable features in the distribution of content and collateral to target consumers. In particular, direct mailings for marketing and consumer communications, to date, have relied on a process of distributing collateral to customers and consumers who are listed on distribution "lists" which are generated by taking consumer data from existing customer management systems and simply dumping the consumer data into a distribution list. Thus, existing customer management systems lack the intelligence and logic of the system and the process of the present disclosure which provide segmentation and apply business processing rules and/or algorithms to categorize, segment, and customize the distribution list according to user-defined parameters.

Furthermore, direct mail companies cannot track usage metrics, revenue, or effectiveness of the distributed collateral. In contrast, the system of some embodiments described in this specification tracks redemption activity and applies business processing and/or user-defined rules for predefined messaging and promotion communications with consumers. The consumer data used by the system described in this specification is aggregated, cleansed, segmented, suppressed, and distributed according to one or more set of processing rules.

The consumer data aggregation and segmented marketing communication system of some embodiments performs a process which may comprised of the following operations. This list of possible constituent operational steps is intended to be exemplary only and it is not intended that this list be used to limit the process of the present application to just these operations. Persons having ordinary skill in the art relevant to the present disclosure may understand there to be equivalent operations that may be substituted within the present disclosure without changing the essential function or operation of the system.

1. Data extraction and acquisition
2. Data aggregation and business logic processing
3. Data outputted by pre-defined segmentation
4. Rules and logic for data entered and data reformatted for distribution
5. Users and passwords assigned in Cloud
6. Consumer redemption captured and tracked
7. Usage metrics and reports created By way of example, FIG. 1 conceptually illustrates a consumer data aggregating and segmented market communication system 100 that performs the process in some embodiments. As shown in this figure, the operations of the process are performed by several components of the system 100. Specifically, the data extraction and acquisition operations (i.e., Step 1, Step 2, and Step 2.1) are performed by components 105-115. The component 120 aggregates the data and performs business logic processing to output the data according to pre-defined segmentation. The database 125 includes the rules and logic for reformatting the data for distribution and saves the users and user credentials (UIDs, passwords, permissions, etc.). The preparation of physical or digital collateral for distribution is performed by the components 130-160. The capturing and tracking of consumer redemption, and the generation of usage metrics and creation of reports are performed by components 165-194.

In some embodiments, the consumer data aggregation and segmented marketing communication system performs the operations of the process through one or more software applications. The software implements the operational steps of the process in relation to four major components of the system and many sub-components.

(1) Data Ingestion and Acquisition Component

In some embodiments, one or more extraction programs are used to retrieve data. In some embodiments, an automated extraction program retrieves data at scheduled times. In some embodiments, non-scheduled data extraction occurs when a user selects an option of the extraction program to retrieve the data from one or more existing customer management systems. Examples of customer management systems include customer relationship management (CRM) systems, enterprise resource planning (ERP) systems, or other business management systems, files, or data sources. Once the extracted data is retrieved, the system aggregates the data for additional processing. In some embodiments, the system aggregates the data by formatting the retrieved data and the storing the formatted data in a cloud-based data storage or file set. In some embodiments, an external system pushes data into the system. The data is pushed by the external system in any known manner, including by web service function calls and pre-processed and formatted files.

(2) Business Rules Engine

In some embodiments, a business rules engine includes programs for processing, cleansing, calculating, and suppressing input data retrieved during data ingestion and acquisition. In some embodiments, the business rules engine includes programs for outputting the data after processing, cleansing, calculating, and suppressing to an intermediate data file to perform further analytics and computations based on user input. In some embodiments, the program applies segments and rules to generate a distribution mail file for each data segmentation and create a distribution schedule (referred to as a "drop" schedule). In some embodiments, the drop schedule is derived from user input and spans a defined period of time.

(3) Cloud Data Administration and Collateral Distribution Preparation

In some embodiments, the data output from the business rules engine is loaded into a cloud-based data storage (e.g., database) in preparation for collateral distribution. Alternatively, or in conjunction with loading the data into the database data storage, the data output from the business rules engine may be sent to a fulfillment house for physical collateral shipment. In some embodiments, special access and data rules or expressions that govern offers and consumer or other end-user access are entered into the cloud database data storage. Examples of access rules that govern consumer and other end-user access to the system include authentication information, such as user names and passwords, as well as permission information, such as user rights and roles. In some embodiments, each consumer is automatically associated with a unique identification (UID) and a default password. An example of a default password is a zip code of the consumer. Alternate passwords for each consumer are possible.

(4) Consumer Identification and Redemption

In some embodiments, redemption of physical or digital collateral by a consumer or other user allows the system to capture and track consumer activity. A business using the system can capture such activity by scanning a barcode, mag-stripe, RFID chip, PDF417 code or by manually entering in unique customer ID (UID) number. This component identifies the consumer and applies any special rules that have been configured during collateral distribution preparation.

In some embodiments, the process can be performed by any business that uses the software within the context of the consumer data aggregation and segmented marketing communication system. All data is driven through user prescribed business rules that create a logic tree that either accepts or rejects data for each phase of data acquisition or end use production. As such, any business can create any number of consumer revenue generating and activity tracking events/programs within the system.

Figure 2:
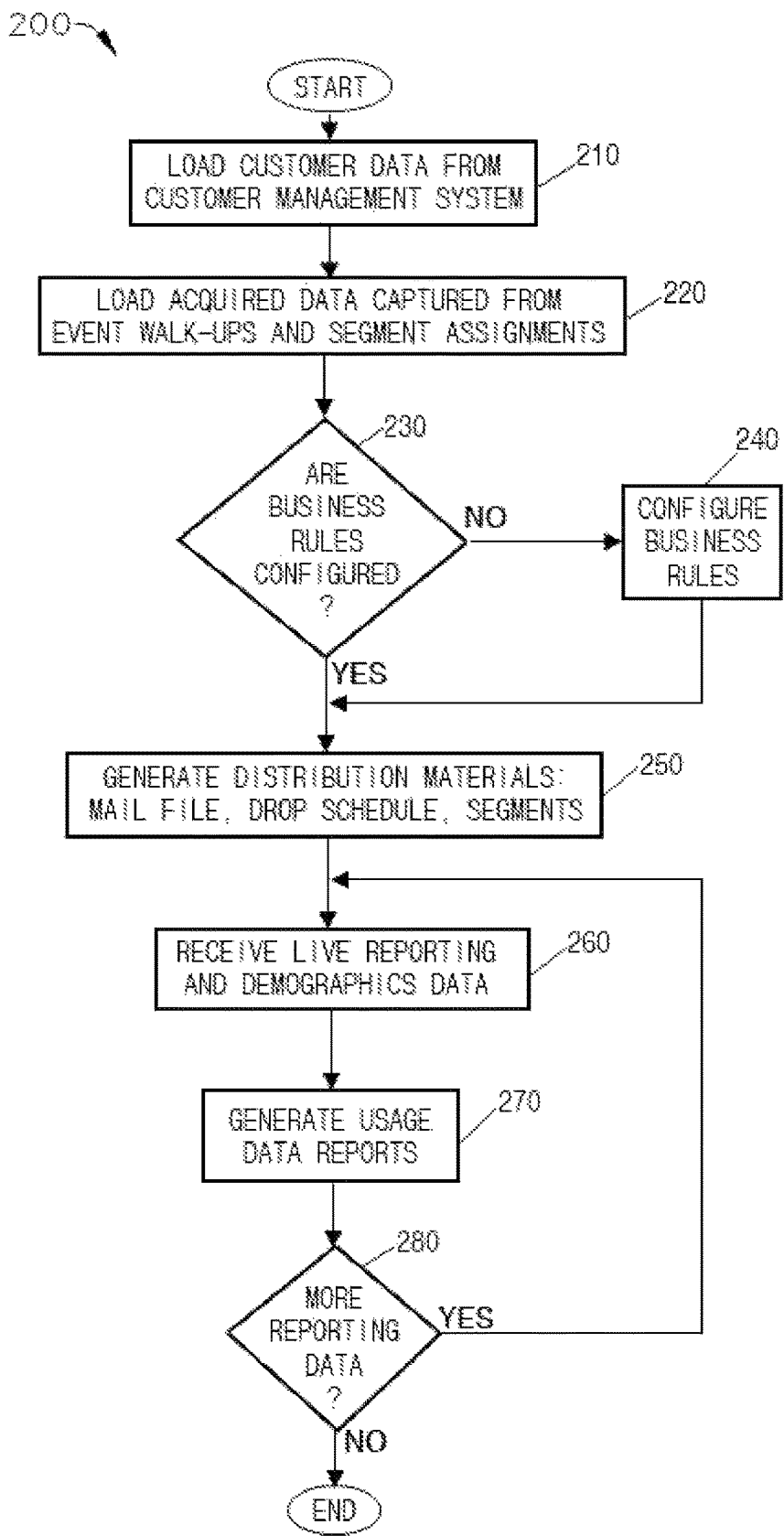
FIG. 2 conceptually illustrates a process in some embodiments for aggregating consumer information and communicating with consumers over segmented markets.

By way of example, FIG. 2 conceptually illustrates a process 200 for aggregating consumer information and communicating with consumers over segmented markets. As shown in this figure, the process 200 starts with data ingestion. Specifically, the process loads (at 210) customer data from one or more customer management systems or data sources. The process also loads (at 220) data captured and acquired from event walk-ups and other conquest data. Next, the process 200 determines (at 230) whether the system includes a set of business rules that are configured. If business rules are already configured, the process transitions to 250, which is described below. On the other hand, if no business rules are configured, the process configures (at 240) the business rules. In some embodiments, the process may receive user input for configuring the business rules, or may load a set of saved business rules from a data source.

When the business rules are configured, the process 200 prepares and generates (at 250) the distribution materials, including the distribution mail file, the "drop" schedule, etc., for each segment of the market. Next, the process receives (at 260) live reporting and demographics data. With this data, the process generates (at 270) one or more usage data reports. Since the live data may be continually received by the system of some embodiments (e.g., during a live event in which consumer data is routinely transmitted to the cloud), the process cycles between receiving data and generating/updating the data reports. Thus, the process determines (at 280) whether more reporting data is being received. If so, the process transitions back to 260 to receive the live reporting data, as described above. On the other hand, if the process determines that live reporting of data is not happening any longer (i.e., all data received from an event), then the process ends.

Figure 3:
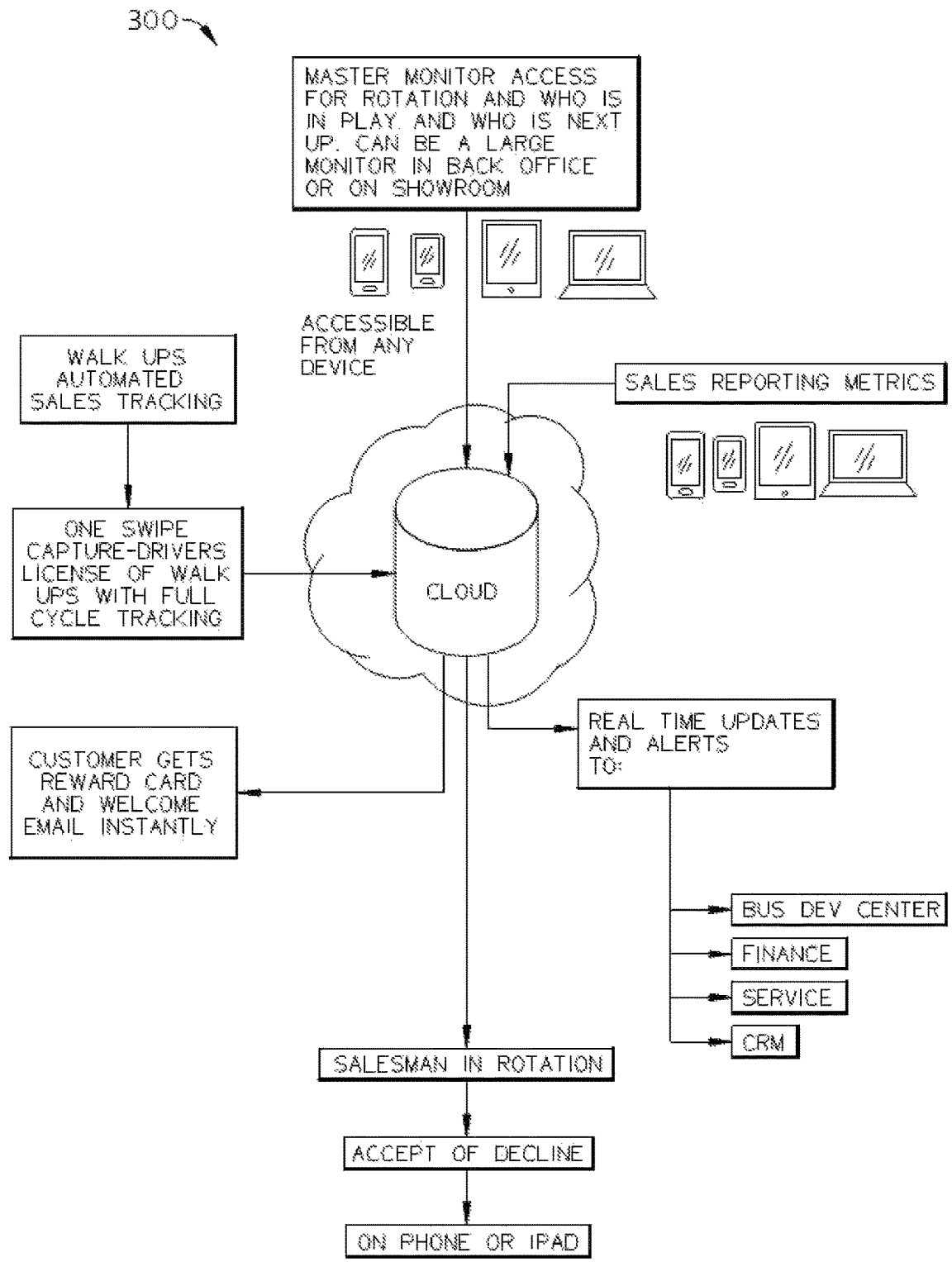
FIG. 3 conceptually illustrates an customer walk-up data acquisition and live posting system in some embodiments.

The live reporting aspect of the system, in particular, is an event-oriented sub-system in which consumer data is captured and transmitted to the system while the event is ongoing (if an Internet connection is available) or at a later time (when an Internet connection can be secured). By way of example, FIG. 3 conceptually illustrates an example of a customer walk-up data acquisition and live posting system 300 used for capturing consumer data during an event and for reporting on consumers while the event is live and ongoing. As shown in this figure, the live event system 300 used in this example provides scheduling of equipment for consumers at the event who are interested in testing the equipment. All consumer data and related information that is captured is transmitted to the cloud for integration into the consumer data aggregation and segmented marketing communication system 100, described above by reference to FIG. 1.

To make the consumer data aggregation and segmented marketing communication system 100, a person may develop software applications that implement the process 200 described above by reference to FIG. 2. The software may include cloud based technology, computer database and client device programming, coding techniques such as barcode, PDF 417, mag-stripe, communication protocols and specific industry items, such as might be found in the automobile and power sports markets. Business procedures and data demographics along with user interface items may be programmed into the software. The person may include functional and operational components in the software which allow mobile and distributed technologies to interface with existing CRM, ERP, and other source business data systems. The software may be written in an advanced programming language, such as C, C++, C#, Visual Basic, Java, etc. The software may be written to process logic derived from a user and translated for processing conditions. Special security components, database administration, and other features related to data scalability may be included with the software.

To use the consumer data aggregation and segmented marketing communication system 100, any company wanting to increase revenue, reclaim lost customers, and offer incentives to not-yet-known consumers and track the success of the system and program, would specify a target consumer audience they wish to target. The system would in turn begin the processes involved with extracting and acquiring the data. Users and special data rules would be loaded using an admin interface software tool to identify and authenticate users into the system for subsequent tracking and reporting access. The system can be used to process consumers at a live event, such as an automobile show, motorcycle show, boat show, state fair, art event, concert, etc. In some embodiments, any prior attendee or consumer data in that region would be loaded to automatically process attendees. All redemption activities such as admit fees or Point of Sale transactions would be tracked by the unique consumer ID (UID). In some cases, the UID, whether physical or virtual-digital, would be either debited or credited by the amounts specified by the cloud rules engine.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
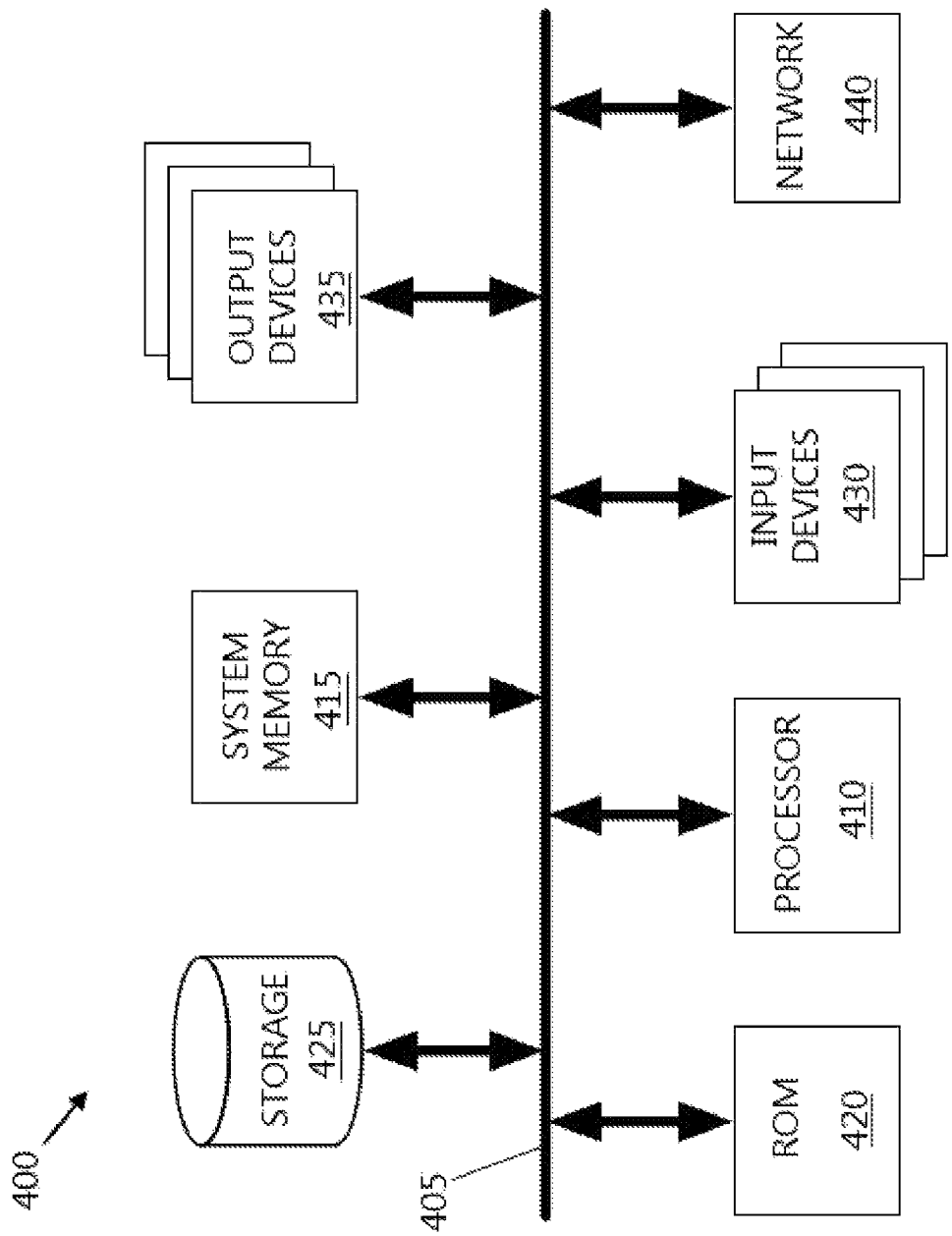
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 2 conceptually illustrates a process. The specific operations of the process 200 may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A consumer data aggregation and segmented marketing communication system that assists companies to recapture lost customer and consumer contacts and acquire new customers and consumer leads, said system comprising:
    a set of local and cloud-based data sources comprising a set of stored customer and consumer data;
    a customer data ingestion and acquisition system comprising a set of single swipe card readers and a set of customer walk-up computing devices that capture customer identifying information from a set of live event walk-up customers, wherein each customer walk-up computing device is communicably connected to at least one of the single swipe card readers to capture customer identifying information when a live event walk-up customer swipes a readable card with customer identifying information that self-identifies the live event walk-up customer;
    an intermediate data file that is an intermediate output product of a business rules engine that processes, cleanses, calculates, and suppresses a set of input data comprising the customer identifying information from the set of live event walk-up customers and the set of stored customer and consumer data retrieved from the set of local and cloud-based data sources;
    a set of distribution mail files that are final output products of the business rules engine when the business rules engine applies segments and rules to the intermediate data file, wherein the set of distribution mail files specify at least one of physical collateral and digital collateral to deliver to a plurality of customers and consumers comprising the set of live event walk-up customers based on the customer identifying information and the a set of other customers based on the set of stored customer and consumer data retrieved from the set of local and cloud-based data sources;
    a collateral distribution fulfillment house for physical collateral shipment and digital collateral electronic delivery, said collateral distribution fulfillment house comprising a collateral distribution preparation system, wherein the collateral distribution preparation system comprises a set of distribution computers that prepare trackable and redeemable physical collateral and digital collateral for distribution to customers and consumers according to the set of distribution mail files;
    a consumer identification and redemption tracking system that tracks redemption of physical collateral and digital collateral by any customer and any consumer in the plurality of customers and consumers, wherein the consumer identification and redemption tracking system captures redemption of physical collateral and digital collateral when at least one of the customer and the consumer scans at least one of a barcode, a magstripe, an RFID chip, and a PDF417 code, wherein the consumer identification and redemption tracking system further captures redemption of physical collateral and digital collateral when a unique customer ID associated with at least one of the customer and the consumer is manually entered;
    a live reporting and real-time live event management system comprising a cloud-network accessible server and a cloud database comprising a set of configurable business rules to categorize, segment, and customize customer information comprising (i) live event status and tracked customer activity information provided by the customer data acquisition and live posting system during the live event;
    a live data ingestion and acquisition system comprising a set of data acquisition computers that (i) receive customer identifying information at the live event, tracked customer activity from one or more prior events, and sales reporting metrics from the live reporting and real-time live event management system during the live event, (ii) retrieve customer and consumer data, and (iii) receive redeemed collateral customer data with respect to collateral redeemed by customers and consumers after the live event; and
    a set of consumer access computing devices that access the cloud-network accessible server of the live reporting and real-time live event management system to retrieve live reporting and real-time event information of tracked customer activity according to the user-defined parameters.

2. The consumer data aggregation and segmented marketing communication system of claim 1 further comprising a report generation tool that prepares live usage data and generates reports for revenue, points, and credits and reports of consumer activity based on tracking data of the redeeming consumers from the consumer identification and redemption system.

3. The consumer data aggregation and segmented marketing communication system of claim 2, wherein the generated reports comprise maps of tracked demographic customer usage data.

4. The consumer data aggregation and segmented marketing communication system of claim 1, wherein the redeemable physical collateral comprises at least one of a reward card, a direct mailing, a savings card, and a fob.

5. The consumer data aggregation and segmented marketing communication system of claim 1 further comprising a set of user parameters, wherein the set of user parameters comprises a business promotion parameter related to at least one of a business product promoted at the live event and a business service promoted at the live event.

* * * * *